Patented May 14, 1940

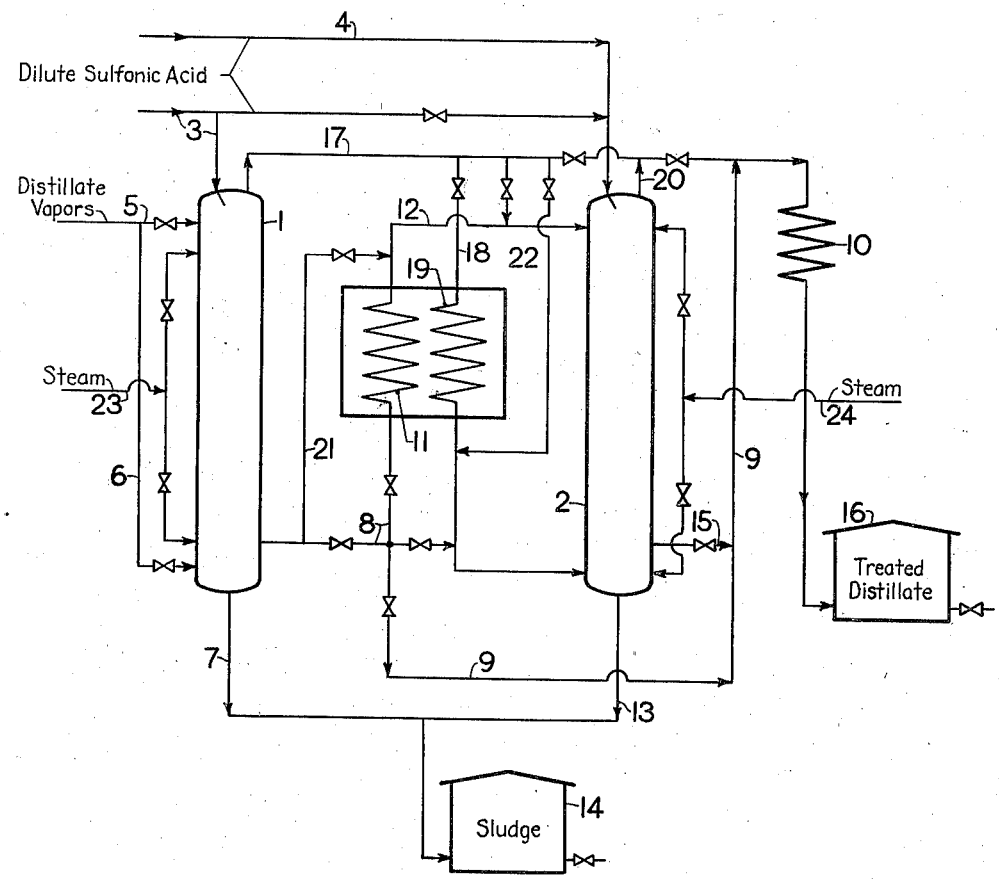

2,200,704

UNITED STATES PATENT OFFICE 2,200,704

PROCESS FOR REFINING HYDROCARBON OILS

Edmond R. P. E. Retailliau, Edwardsville, Ill., assignor to Shell Development Company, San Francisco, Calif., a corporation of Delaware Application May 18, 1938, Serial No. 208,698

10 Claims. (Cl. 196—36)

This invention relates to a process for refining hydrocarbon oils in a heated vaporous condition by contacting same with a chemically acting acid refining agent, and more particularly is concerned with the vapor phase refining of gasoline distillates at elevated temperatures with dilute solutions of organic sulfonic acids.

The use of organic sulfonic acids in the vapor phase treatment of hydrocarbon distillates has been described in the Moser Patent No. 2,055,416, according to which sulfonic acids are dissolved in a liquid organic solvent such as a mineral oil substantially non-volatile under the conditions of the treatment. The distillate vapors and the solution of sulfonic acid are suitably contacted, whereby a portion of the sulfonic acid in the solution is "spent" and vapors are refined. The treated vapors are separated from the solution and are condensed. Fresh sulfonic acid is added to the solution to replace the spent portion and the resulting regenerated solution is used for treating further amounts of the distillate vapors.

I have found that the above method entails considerable difficulties, one of the most serious being the gum and coke formation in the solution, the sulfonic acids slowly attacking the oil solvent, thereby being consumed and forming undesirable by-products which tend to gum and coke up the equipment.

It is a purpose of this invention to provide a method for refining unstable hydrocarbon distillates, such as cracked gasoline distillates to produce stable oils of good color and color stability, low gum and high gum inhibitor susceptibility. It is another purpose to achieve this result by treating same with organic sulfonic acids under conditions to avoid gumming and coking of the equipment. It is another purpose to carry out the process so that a minimum of organic sulfonic acid is expended and a minimum loss of hydrocarbon distillate is sustained; and it is another purpose to eliminate recirculation of unconsumed treating reagent thereby materially simplifying the refining equipment.

I have discovered that hydrocarbon distillates can be treated effectively with organic mono- and poly-sulfonic acids to the exclusion of the difficulties hereinbefore described if the sulfonic acids are injected into the hydrocarbon vapors in amounts which are completely consumed in a once through operation, provided sufficient time of contact is allowed, in the form of dilute aqueous solutions. My method consists essentially of introducing the exact amount of sulfonic acid which is required to refine a given hydrocarbon oil to a desired degree and which is completely converted to sludge in a single contact, in the form of a dilute solution, preferably aqueous solution, of less than about 20% concentration into the hydrocarbon vapors and passing vapor and reagent as a mixture through a treating zone containing solid obstructions, for instance in the form of a packing. After passing through the treating zone, refined hydrocarbon vapors and resulting sludge are separately withdrawn and vapors are condensed. The resulting condensate is normally neutral and may be sweetened by any conventional sweetening process. At times it may contain small amounts of $SO_2$ liberated from the sludge by thermal decomposition, in which case it must be neutralized.

Oils susceptible to my treatment are in particular cracked gasoline distillates, although the process is applicable as well to cracked tractor fuels having boiling ranges from about 200° F. up to about 575° F., and distillate fuel oils such as the No. 1 to No. 3 fuel oils by the A. S. T. M. specifications D396–34T, which oils may boil between about 300° to 600° F. A common difficulty of burners designed to operate on distilled fuel oils is the clogging of the screen through which the fuel must pass before combustion. This difficulty is largely overcome when treating the distillate fuel oils by my process. Moreover as the result of the treatment carbon forming bodies which have a tendency to cause soot are at least partially eliminated.

Frequently a considerable desulfurization is noted in particular when operating on high sulfur distillates; and nitrogen bases contained in the distillates may be and usually are completely removed in the course of my treatment.

Sulfonic acids to be suitable for my process should preferably be at least slightly soluble in water, i. e., they should be capable of forming aqueous solutions at temperatures below 212° F. of at least ½% concentration. Especially suitable for my purpose are the mono- and poly-sulfonic acids of benzene, toluene, xylene, naphthalene and other aromatic hydrocarbons. Also aliphatic mono- and poly-sulfonic acids of methane, ethane, propane, etc., are useful. The organic radicals of these acids may contain substitution radicals, negative substituents such as halogens being in general preferable to positive substituents such as amino groups. Thus I may use chlor benzene sulfonic acids, sulfonic acids of phenols and cresylic acids, etc. Also mixtures of different sulfonic acids are often very useful, and the sulfonic acids may contain varying amounts of sulfuric acid, sulfuric acid in accordance with my co-pending application Serial No. 208,697, filed May 18, 1935, being a useful treating reagent under the conditions of my process. On the other hand, metal salts of sulfonic acids are substantially ineffective in my process, the refining effect of salts such as zinc and other metal sulfonates being too weak under the conditions of my process and having the disadvantage of tending to plug the treating zone.

To provide an effective contact between the solution of the reagent and the vapors, the former is effectively dispersed within the latter as by spraying, spreading over a large contact surface such as that of a packing, or other suitable means. The volume ratio of the reagent solution to hydrocarbon vapors being very small in my process in spite of the high degree of dilution of the former, treatment by passing the vapors through a liquid pool of the solution is impractical, if not impossible.

The treating zone may conveniently consist of a vertical tower or column containing an inert relatively coarse packing such as broken brick, tile, pumice, coke, steel wool, rings made from silicious materials, iron copper, etc. In general it is unnecessary that the packing be corrosion resistant against the sulfonic acid, because within a short time it is completely covered by a protective coating of sludge. It is, however, necessary that the packing material be inert towards the sludge, and it should preferably have a compressive strength sufficient to support a bed at least 20 to 40 feet deep, even after prolonged exposure to the sludge.

During the contact of the reagent solution and hot hydrocarbon vapors, several reactions take place almost simultaneously. Water of solution begins to vaporize immediately, whereby the reagent within the individual droplets or the film is concentrated rapidly. Simultaneously the sulfonic acid begins to react with the most reactive components in the vapors. The result is that by the time the reagent has been concentrated to a point sufficient to cause charring or oxidation, it is already sufficiently spent and diluted with its own products of reaction, so that it no longer can develop the harmful charring or burning effect.

In contact with the vapors, the sulfonic acid reagent is converted to a fluid sludge which deposits on the packing, enveloping and protecting same, and eventually runs down to form a liquid pool at the bottom of the treating zone from which it can be withdrawn readily. In the early stages of its formation this sludge exerts a definite refining action on partly refined vapors until its free acidity is substantially consumed or the vapors become unreactive. The final sludge differs considerably from acid sludges formed in conventional sulfonic acid treatment. For instance, it contains no free sulfonic acid and is substantially non-corrosive to iron, copper and many other metals. It has a pleasant aromatic odor, is completely soluble in gasoline, insoluble in water and ethyl alcohol, and does not usually evolve $SO_2$ on standing at room temperature. Its sulfur content is high and hydrolysis with a concentrated HCl at 300° F. under reflux has shown it to be free from esters.

The reagent solution and vapors may be passed through the treating zone concurrently or countercurrently. In general I prefer concurrent flow, as it normally results in smaller treating losses for a given degree of stabilization of the hydrocarbon oil. This may be due to the fact that in concurrent flow the most reactive and most unstable components of the hydrocarbon vapors are removed by the fresh reagent. If the correct amount of the reagent is used, i. e., that which is substantially spent and used up when the most unstable components have been converted to sludge and/or polymers, other components which are more stable and yet capable of reacting with the reagent are but little affected, because the reaction which they undergo in contact with sludge in the digesting period following the first rapid reaction, appears to be of the nature of reforming resulting in little additional formation of sludge and polymers, if any, but usually resulting in a considerable increase in stability, gum inhibitor susceptibility and other properties of the distillate which depend upon such reformation. In other words, concurrent flow is highly selective, eliminating in the form of sludge and polymers essentially the most reactive components only and converting reactive components of lesser instability to stable components boiling largely within the boiling range of the untreated hydrocarbons. In this manner minimum loss in the form of sludge and polymers is combined with satisfactory chemical stabilization.

In countercurrent flow on the other hand the fresh reagent comes in contact with vapors from which at least a portion of the most reactive components have already been eliminated in the form of sludge and high boiling polymers. Consequently, the more stable reactive components will be attacked to form additional sludge and high boiling polymers.

As hereinbefore stated I use an amount of treating reagent which is completely used up in a single pass. This has the advantage in addition to forming a non-corrosive sludge, of obviating recirculation of unconsumed reagent, a feature which greatly simplifies the treating equipment and reduces the cost of installation. Moreover, at no time are vapors exposed to an excess of reagent, so that only the very minimum amount of reagent is consumed and only the most unstable components are converted to yield the minimum amount of sludge and polymers.

The distillates resulting from my treatment are improved in regard to their color, gum stability, susceptibility toward gum inhibitors, as is usual in chemical refining processes. In one important aspect, however, the distillates from my process differ from those of other sulfonic acid treating processes. Normally sulfonic acid treatment materially reduces the octane number of gasolines. My treatment, however, normally does not affect the octane number and in some instances an appreciable rise has been noted.

Small amounts of the polymers formed by my treatment retained by or added to treated distillates may have a beneficial influence on their gum stabilities and/or gum inhibitor susceptibilities.

The most essential factors in my treatment are amounts and concentration of the reagents, and temperature and time of the reaction.

Concentration of the aqueous reagent solution affects the process in at least two ways: it influences the effectiveness of distribution of the reagent throughout the vapors, and, if too high, may be the cause of charring, burning and/or oxidation of the vapors. The greater the dilution, the greater is the volume of treating solution to be used and the more efficiently can it be injected into and distributed throughout the vapors. From this point of view it is in general desirable to use concentrations not in excess of about 10% by weight, although when operating at relatively low temperatures, concentrations up to about 20% by weight, may be employed without substantial danger of charring and burning. On the other hand at relatively high temperatures I have successfully used solutions having concentrations as low as .5% and even lower concentrations may be employed, if desired.

Amounts of reagents suitable for my treatment are between about .02 to 4 lbs. and preferably less than about 1 lb. of reagent per barrel of distillate. To minimize consumption of reagent, the minimum amount which gives a satisfactory treating result is obviously the most desirable. This minimum varies considerably with the type of distillate under treatment and also with the individual sulfonic acid used.

Suitable contact temperatures are in general of the order of about 200° to 400° F., temperatures between about 230° to 300° F. being preferred. At relatively high temperatures i. e., 300° F. and higher, the sludge has a considerable tendency to decompose, thereby liberating $SO_2$ and forming coke, and at temperatures below about 250° F. average gasoline distillates are incompletely vaporized. If relatively low temperatures are desired, resort may be had to subatmospheric pressures in order to effect complete vaporization. It is desirable that the hydrocarbon distillate be completely vaporized in the treating zone, as I have found that the presence of hydrocarbons in the liquid state adversely affects the treating results and in particular raises the polymerization losses.

Superatmospheric pressures may be employed if desired but are limited by considerations of temperatures and volatility of the hydrocarbons as explained above. The effect of superatmospheric pressures is mainly that of lengthening the time of contact in the treating zone for a given throughput and also of reducing the hypothetical potential concentration of the reagent at a given temperature, due to an increase of the steam pressure in the vapors. On the other hand when treating relatively high boiling distillates a considerable vacuum may have to be maintained in the treating zone to enable substantially complete vaporization and to prevent condensation of the distillate at the most desirable treating temperatures.

The time of contact may be varied between the limits of about 3 to 90 seconds and may if desired be extended beyond these limits. In general at relatively low temperatures longer times of contact are permissible and required than at higher temperatures under otherwise equal conditions. Reaction times of less than about 3 seconds are normally insufficient. With increasing time of contact above about 3 seconds the stability of the hydrocarbon oil increases while treating losses may rise but little and often remain substantially unchanged. On the other hand if contact is extended beyond a certain time which depends largely upon the temperature, stability is not further improved materially and certain disadvantages make themselves felt such as the extremely large size of the reaction vessel which is required for a given throughput and the great tendency of the sludge to decompose thereby liberating $SO_2$ which is harmful to the gasoline, and coke which is liable to plug the packing.

Coking of the sludge can be minimized within limits by employing multi-stage treating systems in which the treating reagent is divided into as many portions as there are stages, one portion being injected into each stage, sludge being withdrawn separately from each stage, and the vapors are passed serially through the several stages. The concentration of the solutions injected into the several stages need not be the same, neither is it necessary to maintain the same treating conditions in the various stages. On the contrary, I have found that it is advantageous to maintain progressively lower temperatures between 200° and 400° F. in successive stages, and to inject aqueous reagent solutions of progressively higher concentrations.

As to the amount of sludge formed in the several stages I have found that most of it is produced in the first stage, very little if any being formed in subsequent stages.

It is usually unnecessary, though permissible, to precede my treatment with a caustic alkali or an acid wash for the removal of impurities such as mercaptans, alkyl phenols, nitrogen bases, etc. A preliminary liquid phase wash has the disadvantage of necessitating the steps of condensing and redistilling the treating stock, whereas in the absence of such a wash these steps are obviated.

My process will be further understood from the drawing which represents a simplified flow diagram of one form of my process.

A dilute aqueous solution of a suitable reagent, such as benzene sulfonic acid is admitted to the top of treating tower 1 through line 3, and a similar solution may be injected into the top of treating tower 2 through line 4 from sources not shown. Distillate vapors of the proper temperature enter tower 1 near its top through line 5, or near its bottom through line 6. In the tower the acid and the vapors are closely contacted and react as hereinbefore described, forming a fluid sludge which is withdrawn through bottom line 7. If the vapors are admitted at the top they are withdrawn near the bottom through line 8 at a point sufficiently above the sludge line 7 to permit a clean separation of sludge and vapors. The treated vapors may be passed through line 9 directly to condenser 10, in case tower 1 only is in operation. If both towers 1 and 2 are in use, the vapors may pass through reheater 11 in line 12 which serves to readjust the temperature and the reheated vapors enter tower 2 near its top. If desired the reheater 11 may be by-passed through line 21. The vapors in tower 2 in contact with the sulfonic acid solution from line 4 produce a small amount of sludge which is removed through bottom line 13 and is collected in tank 14 together with sludge from tower 1 and line 7. Vapors treated in tower 2 leave through line 15 near the bottom and pass through line 9 to condenser 10 where they are condensed, condensate being accumulated in tank 16.

A similar procedure applies, if the raw distillate vapors enter tower 1 through line 6 near its bottom. Treated vapors are withdrawn through top line 17 and may pass to condenser 10, or they may go to the bottom of tower 2 through reheater 19 situated in line 18 or by-pass 22, to be further treated. Retreated vapors leave tower 2 through top line 20 passing to condenser 10 and tank 16. In some cases it may be advantageous to use concurrent flow in treater 1 and countercurrent in treater 2 or vice versa, depending on the refractoriness of the charging stock.

Steam may be injected into towers 1 and/or 2 if desired through lines 23 and/or 24 respectively, at some convenient points to facilitate the vaporization of the distillate.

The following examples further serve to illustrate my process:

Example I

A highly unstable cracked gasoline distillate was washed with dilute aqueous solutions of caustic soda and sulfuric acid at about normal room temperature, and the washed distillate was refined by concurrently contacting same in the vapor phase at 280° F. with a 2% solution of benzene sulfonic acid in water, in an amount of 30% by volume of the gasoline (equal to 2.1 lbs. benzene sulfonic acid per barrel of the gasoline). The contact time was varied from 3.6 to 14.6 seconds with the following results:

| | | | | |
|---|---|---|---|---|
| Treating time | 3.6 | 7.3 | 13 | 14.6 |
| Polymerization loss | 1.4 | 1.4 | 2.2 | 2.3 |
| Sludge loss | .8 | .8 | .8 | .4 |
| Recovered gasoline | 97.8 | 97.8 | 97.0 | 97.3 |
| Induction period of sweetened gasoline, hours | 1 | 2½ | 4 | 4¾ |
| Ditto, plus .001% gum inhibitor | 2½ | 5 | 6+ | 7¼ |

Example II

In another series of tests, a cracked washed gasoline similar to that of Example I was contacted concurrently in the vapor phase with an 8.3% solution of benzene sulfonic acid in an amount of 3% by volume of the gasoline (equal to .088 lb. benzene sulfonic acid per barrel of gasoline) for 4.1 seconds at various temperatures. The treating results were as follows:

| | | | | |
|---|---|---|---|---|
| Treating temperature, °F | 230 | 265 | 280 | 305 |
| Polymerization loss | *1.8 | 0.0 | .9 | .3 |
| Sludge loss | .6 | .6 | .3 | .3 |
| Recovered gasoline | 97.6 | 99.4 | 98.8 | 99.4 |
| Properties of gasoline after doctor sweetening: | | | | |
| Induction period, hrs | ¾ | 1½ | 3¼ | 3¼ |
| Color Saybolt | 18 | 18 | 18 | 18 |
| A. S. T. M. gum | 0 | 0 | .1 | 2 |
| Octane number | | 68½ | 68 | |

*Gasoline was partially in liquid phase.
The octane number of the pretreated charging stock was 65.

The effect of the presence of liquid gasoline during treating on the polymerization loss, and the unfavorable influence of the temperature above 300° F. on the gum content are to be noted.

Example III

The influence of the quantity of refining reagent was determined in another series of tests in which a pretreated gasoline, similar to those of the previous example, was concurrently treated in the vapor phase at 280° F. for about 14 seconds with varying amounts of benzene sulfonic acid dissolved in water to form dilute solutions.

| | | | | |
|---|---|---|---|---|
| Acid consumption, lbs. per barrel | .091 | .52 | .88 | 2.1 |
| Polymerization loss | 1.7 | 2.2 | 1.5 | 2.1 |
| Induction period, hrs., sweetened with silver nitrate | 4 | 5 | 3½ | 4 |
| Ditto, plus .001% gum inhibitor | 6¾ | 5+ | 6¾ | 6+ |

As will be noted, equally good results are obtained with widely varying amounts of the refining reagent.

Example IV

A caustic soda and dilute sulfuric acid washed cracked gasoline distillate similar to those used in the previous examples having an octane number of 67.5 was treated in two stages at 300° F. with .4 lb. per barrel of benzene sulfonic acid in each stage. The acid was injected into the vapors in the form of a .75% aqueous solution in the first stage and a 3.0% aqueous solution in the second stage. The total time of contact was 60 seconds. Treating results were as follows:

Treating loss _____ percent__ 3.4
Induction period after sweetening _____ hours__ 5
Inhibitor susceptibility for U. O. P. inhibitor No. 2 _____ 240
Octane number _____ 68

Inhibitor susceptibility as herein defined is the increase in minutes of the induction period upon addition of 1 mg. inhibitor per 100 ml. gasoline.

When treating the above washed cracked gasoline with 1 lb. per barrel of concentrated sulfuric acid in the conventional manner at ordinary room temperature, a loss of the same magnitude was sustained and the inhibitor susceptibility for the same inhibitor was 80.

Example V

Cracked gasoline distillate, prewashed at normal room temperature with dilute aqueous sulfuric acid and caustic soda solutions, was treated in the vapor phase with varying amounts of benzene sulfonic acid containing 20% sulfuric acid, the acid mixture being introduced in the form of a 1% aqueous solution. The vapors and treating solution were passed in concurrent flow through the treating zone containing a packing maintained at a temperature of 280° F. The time of contact was 20 seconds. Results were as follows:

| | | | | |
|---|---|---|---|---|
| Acid used, lbs./bbl | .08 | .25 | .46 | 1.0 |
| Color Saybolt | 28 | 28 | 30+ | 30+ |
| Copper dish gum | 3 | 9 | 4 | 0 |
| A. S. T. M. gum | 1.6 | .2 | .3 | 0 |
| Induction period | ¾ | 1½ | 2 | 1½ |
| Inhibitor susceptibility (U. O. P. inhibitor No. 2) | 130 | 180 | 180 | 300 |
| Sulfur reduction, percent | | | 20 | 33 |

Example VI

Cracked gasoline substantially free from nitrogen bases and alkyl phenols was treated in the vapor phase with a mixture of equal weights of benzene sulfonic acid and sulfuric acid. Two solutions of acid were used, one being a 1% and the other a 75% solution, respectively. The vapors and treating solutions were passed concurrently through the reaction zone containing a packing of coke at temperatures between 280° and 320° F. The time of contact was held at 20 seconds. The gasoline treated with the two solutions respectively had the following properties:

| | | |
|---|---|---|
| Concentration of solution, percent | 1 | 75 |
| Amount of acid used lbs./bbl | .17 | .35 |
| Color Saybolt | 30 | 23 |
| Copper dish gum | 4 | 5 |
| Induction period | ¾ | 1 |
| Gum inhibitor susceptibility | 300 | 140 |

It will be noted that the more dilute solution resulted in a somewhat superior gasoline in spite of the smaller amount of acid used. Moreover it was possible to continue the treatment with the 1% solution indefinitely without clogging the reaction zone, whereas when using the 75% acid the packing in the treating zone was choked with carbonaceous matter within a few hours.

Example VII

Cracked gasoline substantially free from nitrogen bases and alkyl phenols was treated in the vapor phase with 1% aqueous solutions of various sulfonic acids, using concurrent flow of the vapors and treating solutions through a reaction zone containing a packing of carbon rings. The time of contact was 20 seconds at 280° F. Results were as follows:

| Acid used | p-Xylene sulfonic acid | 1-5 naphthol disulfonic acid | 1-naphthol 5-sulfonic acid | 2-4 dinitro 5-naphthol 7-sulfonic acid | Sulfanilic acid |
|---|---|---|---|---|---|
| Amount, lbs./bbl | .35 | .35 | .35 | .17 | .35 |
| Properties of gasoline: | | | | | |
| Color, Saybolt | 30+ | 30+ | 30 | 30+ | 30+ |
| Copper dish gum | 3 | 2.5 | 6 | 5.5 | 9 |
| A. S. T. M. gum | .2 | .6 | 1.0 | .8 | 0.0 |
| Induction period | 1½ | 2 | 1¾ | 1½ | 1¼ |
| Inhibitor susceptibility | 340 | 360 | 400 | 260 | 260 |

While in the foregoing I have disclosed water only as a suitable solvent for sulfonic acids, I may use other solvents which are substantially chemically inert and substantially completely vaporizable under the conditions of the treatment. For instance, when carrying out my treatment with oil soluble petroleum sulfonic acids such as are obtained in the treatment of viscous petroleum oils with fuming sulfuric acid to produce medicinal oils, I may dissolve these acids in pentane, hexane, straight run gasoline, etc.

I claim as my invention:

1. In the process of removing gum forming components from hydrocarbon oil vapors in a heated condition with a refining reagent, the improvement comprising injecting into said heated hydrocarbon vapors an amount of a dilute reagent solution having a concentration of .5 to 20% in a solvent which is chemically inert and substantially completely vaporizes under the conditions of the treatment, said reagent consisting predominantly of organic sulfonic acid, said amount being between .05 and 1 pound of said reagent per barrel of said oil and being completely consumed in a once-through operation under the conditions of the treatment, conducting said vapors and said sulfonic acid solution in intimate contact through a reaction zone at a temperature between 200 and 400° F., said amount and concentration being so chosen to prevent substantial condensation of the vapors at the temperatures of the treatment, maintaining said contact for a time sufficient to vaporize the solvent substantially completely, thereby concentrating the reagent simultaneously to react at least a portion of said gum forming components with the reagent whereby a sludge is produced, and separating the resulting vapors from the sludge.

2. The process of claim 1 in which a subatmospheric pressure is maintained in the reaction zone.

3. In the process of removing gum forming components from hydrocarbon oil vapors in a heated condition with a refining reagent, the improvement comprising injecting into said heated hydrocarbon vapors an aqueous solution having a concentration of .5 to 20% of a reagent consisting predominantly of organic sulfonic acid in an amount between .05 and 1 pound of said reagent per barrel of oil, said amount being completely consumed in a once-through operation under the conditions of the treatment, conducting said vapors and sulfonic acid solution in intimate contact through a reaction zone at a temperature between 200 and 400° F., said amount and concentration being so chosen to prevent substantial condensation of the vapors, maintaining said contact for a time sufficient to vaporize water of solution, thereby concentrating the reagent simultaneously to react at least a portion of said unstable components with the reagent, whereby a sludge is produced, and separating the resulting vapors from the sludge.

4. In the process of removing gum forming components from hydrocarbon oil vapors in a heated condition with a refining reagent, the improvement comprising injecting into said heated hydrocarbon vapors an amount of a dilute reagent solution having a concentration of .5 to 20% in a solvent which is chemically inert and substantially completely vaporizes under the conditions of the treatment, said reagent consisting predominantly of organic sulfonic acid, said amount being between .05 and 1 pound of said reagent per barrel of said oil and being completely consumed in a once-through operation under the conditions of the treatment, conducting said vapors and said sulfonic acid solution in intimate contact through a reaction zone at a temperature between 200 and 400° F., said amount and concentration being so chosen to prevent substantial condensation of the vapors at the temperatures of the treatment, maintaining said contact for a time sufficient to vaporize the solvent substantially completely, thereby concentrating the reagent while reacting a portion of said unstable components with the reagent, whereby a sludge is produced, and extending the contact between the unreacted vapors and the sludge sufficiently to convert at least a portion of remaining unstable components to more stable products, and separating the resulting vapors from the sludge.

5. In the process of removing gum forming components from hydrocarbon oil vapors in a heated condition with a refining reagent, the improvement comprising passing said heated hydrocarbon vapors serially through several reaction zones, injecting into each zone aqueous solutions having concentrations between .5 to 20% of reagents consisting predominantly of organic sulfonic acids in amounts between .05 and 1 pound of said reagents per barrel of said oil, said amounts of reagents being completely consumed in a once-through operation under the conditions of the treatment, providing for intimate contact of said vapors and solutions in the several zones at temperatures between 200 and 400° F., said amounts and concentrations being so chosen to prevent substantial condensation of the vapors, maintaining said contacts for periods of time sufficient to vaporize the water of solution and to react at least a portion of said unstable components with the sulfonic acids, whereby a sludge is produced and separately removing sludge from each zone.

6. In the process of removing gum forming components from hydrocarbon oil vapors in a heated condition with a refining reagent, the improvement comprising passing said heated hydrocarbon vapors serially through several reaction zones having progressively lower temperatures between 200 and 400° F., injecting into the several zones aqueous solutions having concentrations of .5 to 20% of reagents consisting predominantly of organic sulfonic acids, in amounts between .05 and 1 pound of said reagents per barrel of said oil, said amounts of reagents being completely consumed in a once-through operation through said zones under the conditions of the treatment, providing for an intimate contact in the several zones under conditions to prevent substantial condensation of the vapors, maintaining said contacts for periods of time sufficient to vaporize the water of solution and to react at least a portion of said unstable components with the sulfonic acids, whereby a sludge is produced, and separately removing sludge from each zone.

7. The process of claim 1 in which the hydrocarbon vapors are conducted through the reaction zone in concurrent flow.

8. The process of claim 1 in which the time of contact is sufficient to produce a sludge substantially free of free acid.

9. The process of claim 3 in which the sulfonic acid is benzene sulfonic acid.

10. The process of claim 4 in which the total time of contact is between 3 and 90 seconds.

EDMOND R. P. E. RETAILLIAU.